Jan. 28, 1930.  J. H. WILSON  1,744,851
ATTACHMENT OF HANDLES TO ALUMINUM COOKING UTENSILS
Filed April 11, 1928

WITNESSES
A B Wallace
F B Flick

INVENTOR
John H. Wilson
by Brown & Critchlow
his attorneys.

Patented Jan. 28, 1930

1,744,851

UNITED STATES PATENT OFFICE

JOHN H. WILSON, OF NEW KENSINGTON, PENNSYLVANIA, ASSIGNOR TO ALUMINUM COOKING UTENSIL COMPANY, OF NEW KENSINGTON, PENNSYLVANIA, A CORPORATION OF PENNSYLVANIA

ATTACHMENT OF HANDLES TO ALUMINUM COOKING UTENSILS

Application filed April 11, 1928. Serial No. 269,101.

The invention relates to means for attaching handle members to aluminum containers, and especially to aluminum cooking utensils.

In the manufacture of aluminum containers, such as stew pans and other utensils, supplied with iron or steel handle members, the prevailing practice has been to attach the handles by means of rivets. This practice is objectionable, chiefly because the rivet heads which protrude into the interior of the container interfere with its cleaning, the joints frequently loosen, and because riveting adds unduly to the cost of manufacture.

The object of the invention is to provide aluminum containers or utensils with handle members which are attached in such a manner as to produce strong, durable connections which are free from the objectionable features of rivet connections.

According to the invention, handle members of the usual or any desired type, are attached to aluminum utensils by means of an aluminum handle-attaching member which holds the handle member against the utensil and which is spot welded directly to the utensil at points spaced from the handle. The handle is further maintained in position, and restrained from movement, by inter-engagement of a projection formed on one of said members with a perforation disposed in the other member, and in the preferred embodiment of the invention this locking arrangement comprises an ear formed in the handle which projects outwardly through a slot formed in the handle-attaching member.

The invention is particularly adapted for use in connecting handle members to aluminum cooking utensils, and will be described in detail with reference thereto, but it will be understood that it is applicable to other aluminum containers to which handles or handle-supporting members are connected. It is also particularly applicable to iron or steel handle members, but it can be used with equal effectiveness with handles formed from aluminum or aluminum-base alloys where their use is desired or permissible.

Figure 1:
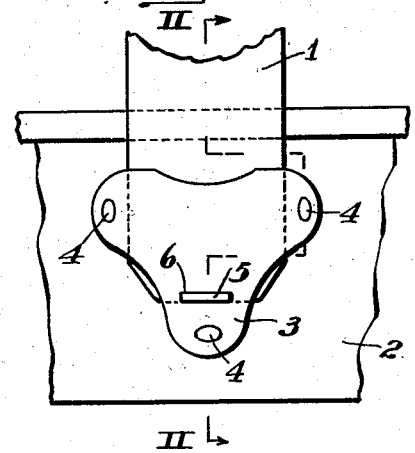
Figure 2:
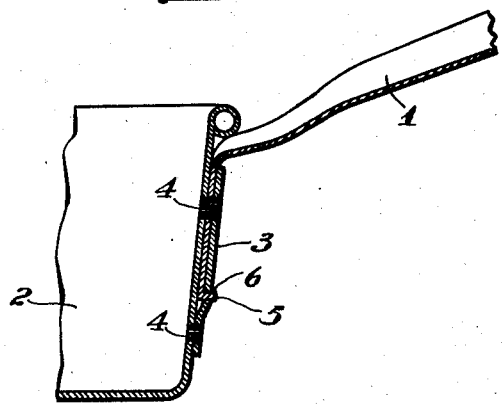

The invention is illustrated in the accompanying drawings, of which Fig. 1 is an elevation of a portion of a utensil having a handle member attached thereto in accordance with the invention; Fig. 2 a vertical sectional view on line II—II, Fig. 1; and Figs. 3 and 4, respectively, an elevation of a handle and a sectional view of a handle-attaching member illustrating a modification of construction.

Referring to the drawings, a handle member 1, Figs. 1 and 2, is shown attached to a utensil 2 by means of a handle-attaching member 3, preferably formed from sheet metal, which engages the handle member and holds it in firm engagement with the side of the utensil. Member 3 is electrically spot welded directly to the utensil at a plurality of points 4 spaced from the handle, and in the preferred embodiment of the invention the spot welding is performed at three points symmetrically disposed about the handle. In order to further engage and prevent movement of the handle member, there is provided on one of these members a projection which, when they are assembled in the attaching operation, engages a corresponding perforation disposed in the other member. This can be done in a number of ways, but it is preferred to accomplish it in the manner shown in Figs. 1 and 2, by bending from the handle an ear or lug 5, and forming a slot 6 in the handle attaching member in such position that when these members are assembled on a utensil the ear engages the slot. The ear is made of such length that it does not project appreciably beyond the outer surface of handle-attaching member 3, as shown in Fig. 2.

In the manufacture of such utensils, handle 1, provided with a projection such as ear 5, is placed at the proper point on a utensil, the handle-attaching member 3 is set against the outer side of the handle with its slot 6 engaging ear 5, and member 3 is spot welded electrically to the utensil at a plurality of points 4, as by means of an electric resistance welding machine provided with electrodes which engage the inner surface of the utensil and the outer surface of the handle-attaching member at the points 4.

Figure 3:
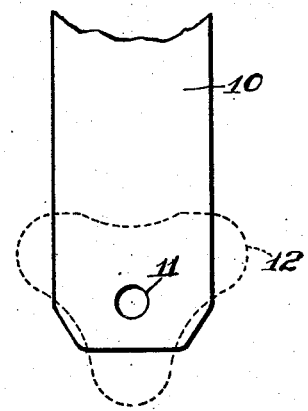
Figure 4:
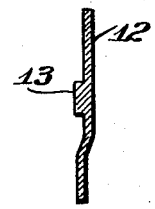

In the modified form of the invention shown in Figs. 3 and 4, there is used a handle member 10 of the usual or any desired form, which is provided at its utensil-engaging end with a perforation 11. The handle-attaching member comprises a plate or sheet metal clip indicated in outline by the numeral 12, Fig. 3, which is provided with an inwardly extending projection 13 adapted to neatly engage perforation 11, and of such thickness as to pass through the handle member without holding the latter away from the utensil. In this form of the invention, the handle attaching member is spot welded to the utensil as in the preceding example. It is also possible in practicing this modification of the invention, to spot weld the projection 13 to the utensil, thus giving further strength to the joint.

The attaching members weld readily to aluminum, to form strong joints, and no metal protrudes from the inner surface of the utensil, thus providing a durable connection, and rendering it easy to clean the entire interior of the utensil. These members may be formed from commercially pure aluminum, or from aluminum base alloys which can be electrically spot welded to aluminum or its alloys, one such being an alloy of aluminum containing about 15 per cent of silicon.

The number and disposition of the perforations and lugs may vary, but the triangular disposition illustrated is preferred, as it provides for the maximum strength and for proper distribution of strains upon the joint.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. The combination of an aluminum utensil, a handle member, and a handle-attaching member formed from aluminum engaging said handle and electrically spot welded directly to said utensil at a plurality of points on each side of said handle, said handle and attaching member being provided one with a perforation and the other integrally with a rigid projection lying in the perforation, said projection being insertable from the inside of said attaching member to lock the handle in its attached position.

2. The combination of an aluminum utensil, a ferrous metal handle member, and a sheet metal handle-attaching member formed from aluminum engaging said handle and electrically spot welded directly to said utensil at a plurality of points spaced from said handle, said handle being integrally provided with a rigid ear extending through a perforation in and insertible from the inside of said attaching member to lock the handle in its attached position.

3. The combination of an aluminum utensil, a ferrous metal handle member, and a sheet metal handle-attaching member formed from aluminum engaging said handle and electrically spot welded directly to said utensil at three points symmetrically grouped around said handle, said handle being integrally provided with a rigid ear extending through a perforation in and insertible from the inside of said attaching member to lock the handle in its attached position.

In testimony whereof, I sign my name.

JOHN H. WILSON.